(No Model.) 8 Sheets—Sheet 1.
A. M. G. SÉBILLOT & F. WEIDKNECHT
SHIP RAILWAY.
No. 530,245. Patented Dec. 4, 1894.
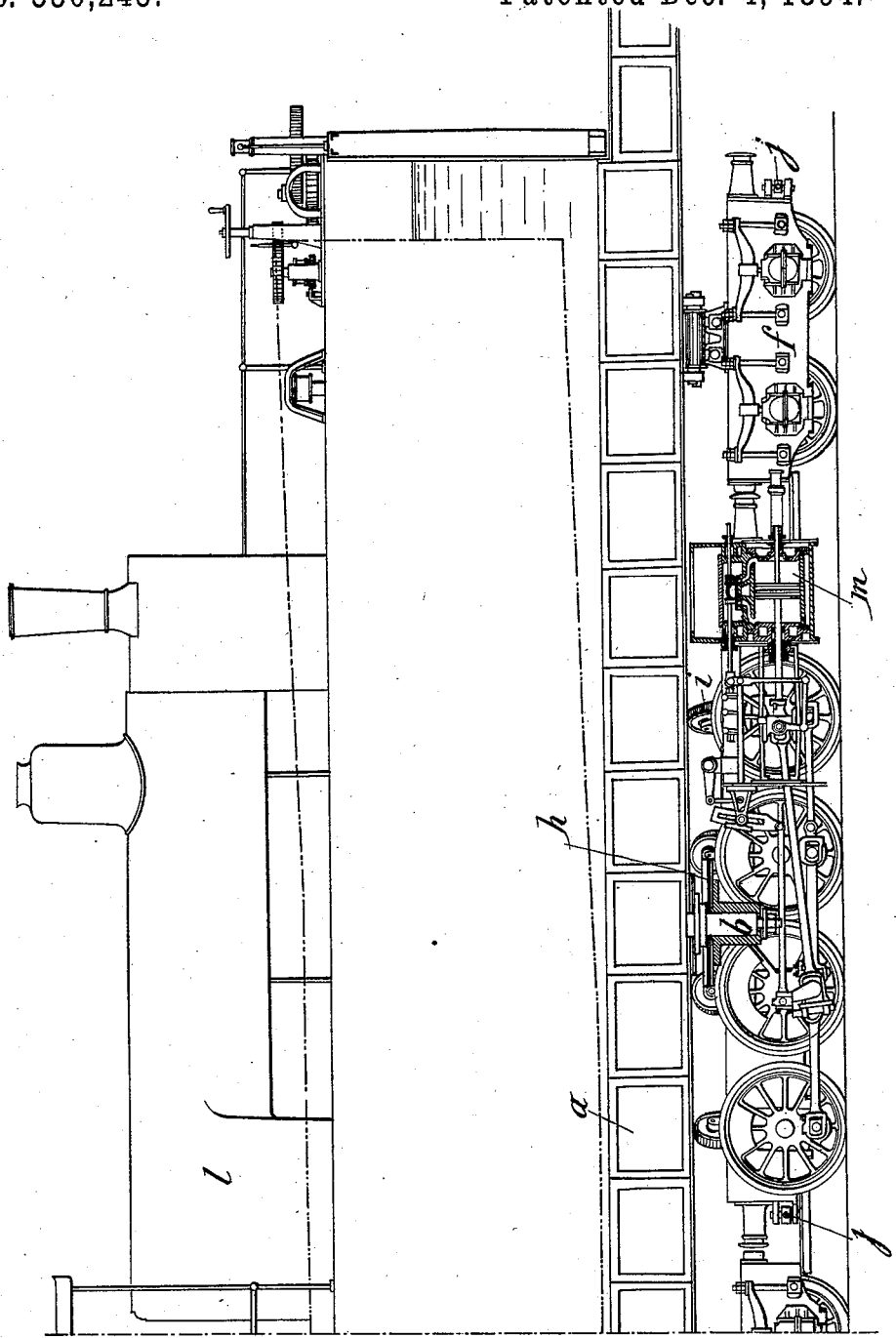

(No Model.) 8 Sheets—Sheet 2.
A. M. G. SÉBILLOT & F. WEIDKNECHT.
SHIP RAILWAY.
No. 530,245. Patented Dec. 4, 1894.
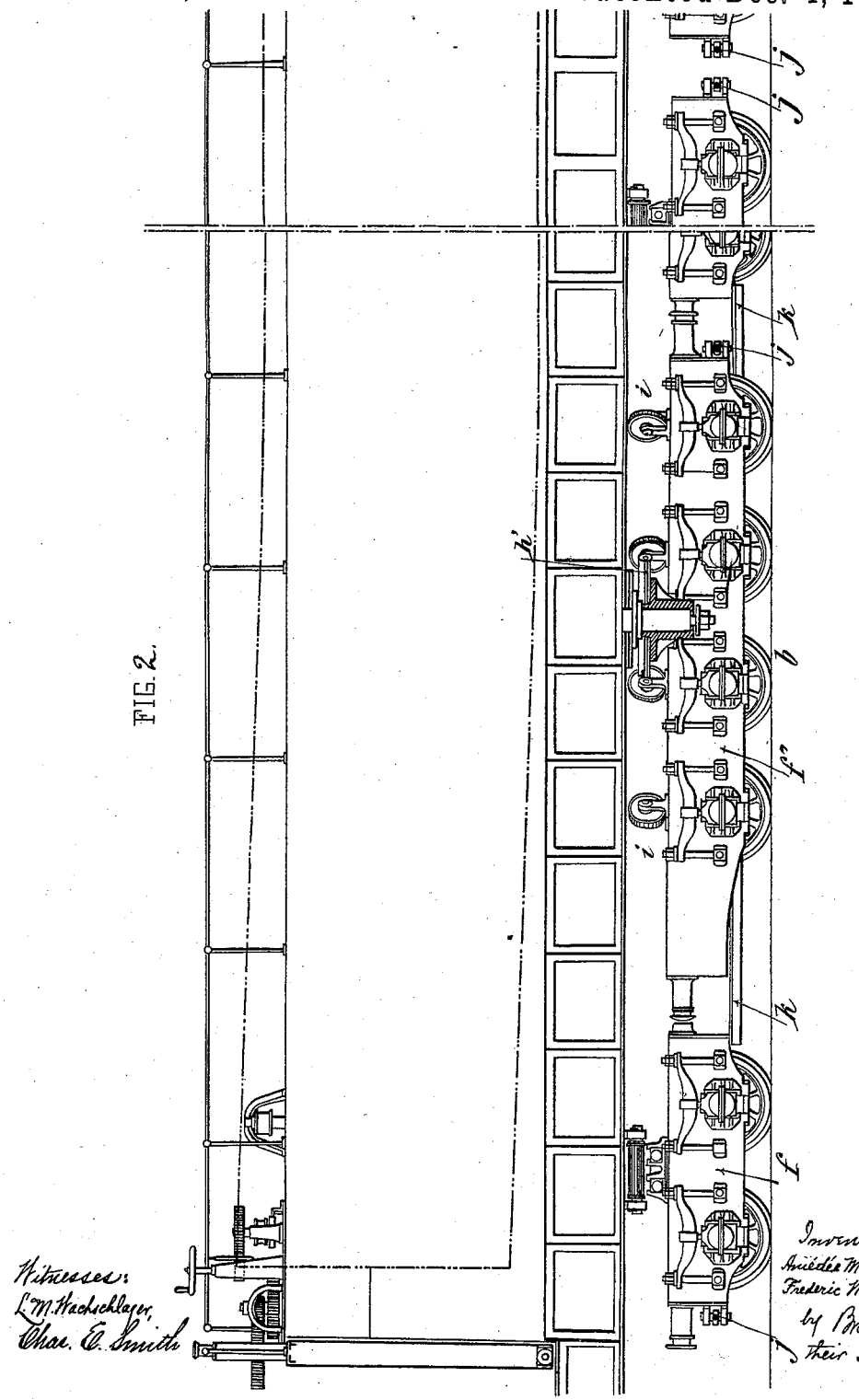

(No Model.) 8 Sheets—Sheet 3.

A. M. G. SÉBILLOT & F. WEIDKNECHT.
SHIP RAILWAY.

No. 530,245. Patented Dec. 4, 1894.

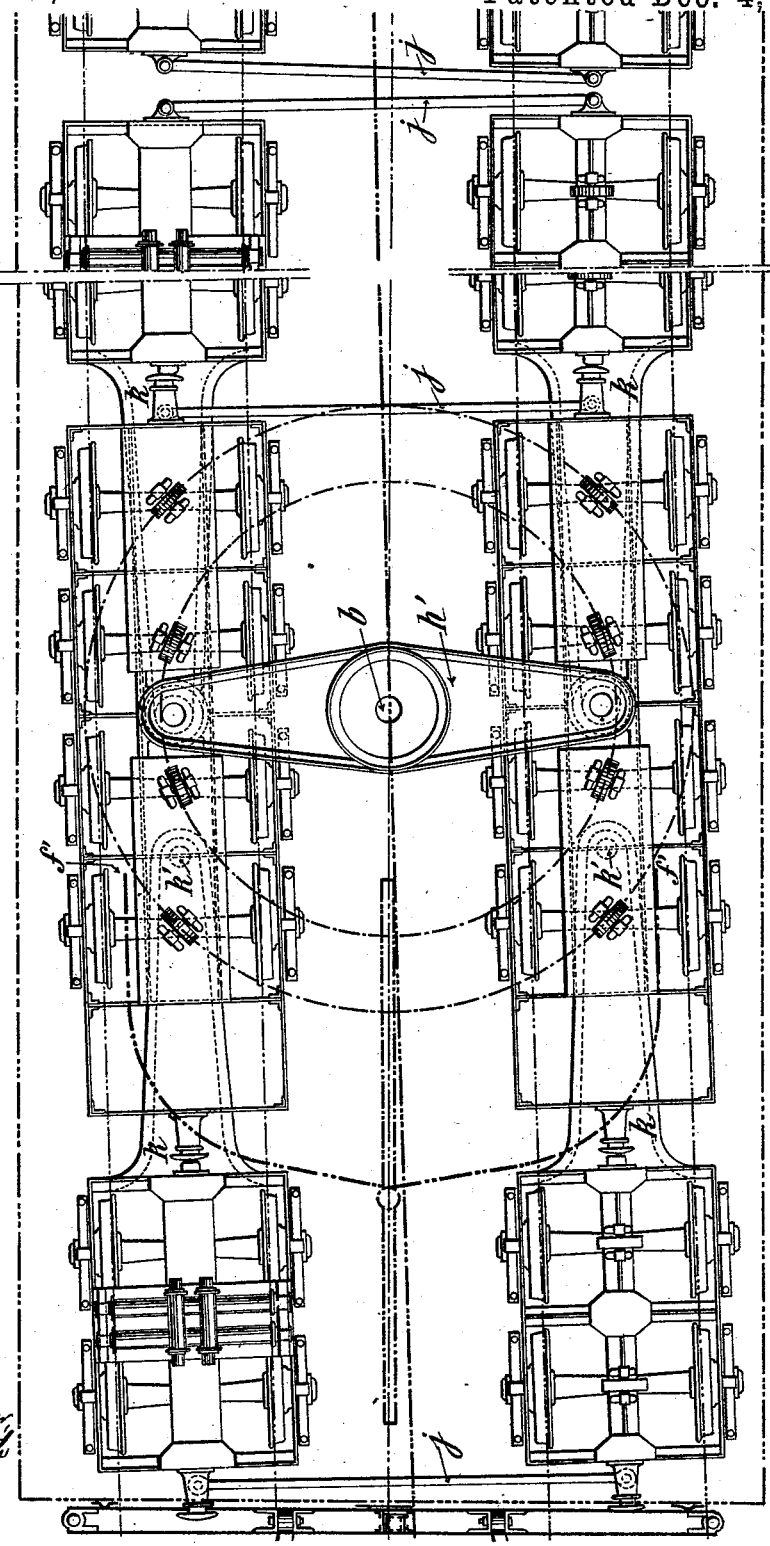

(No Model.) 8 Sheets—Sheet 5.
A. M. G. SÉBILLOT & F. WEIDKNECHT.
SHIP RAILWAY.
No. 530,245. Patented Dec. 4, 1894.
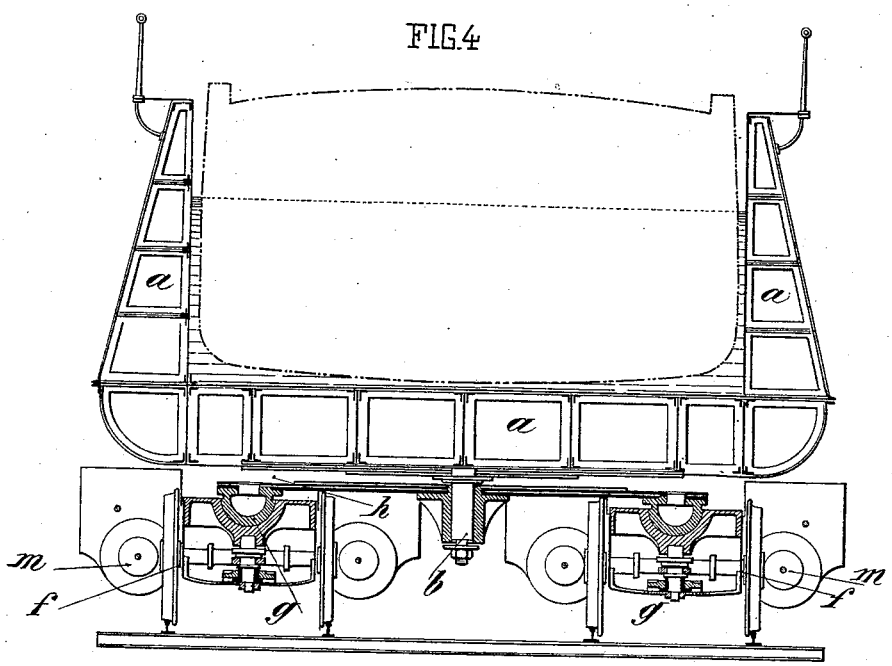
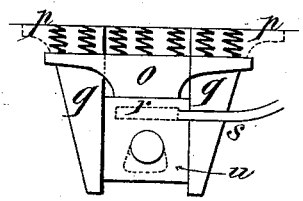
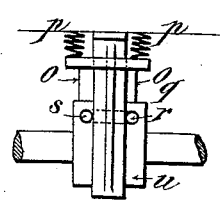
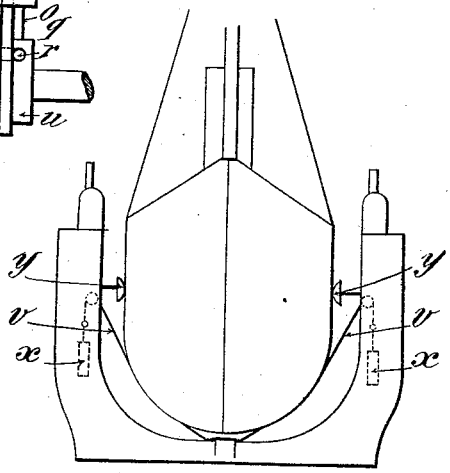
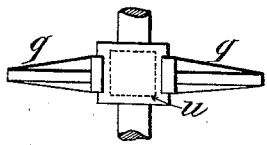

(No Model.) 8 Sheets—Sheet 6.
A. M. G. SÉBILLOT & F. WEIDKNECHT.
SHIP RAILWAY.
No. 530,245. Patented Dec. 4, 1894.
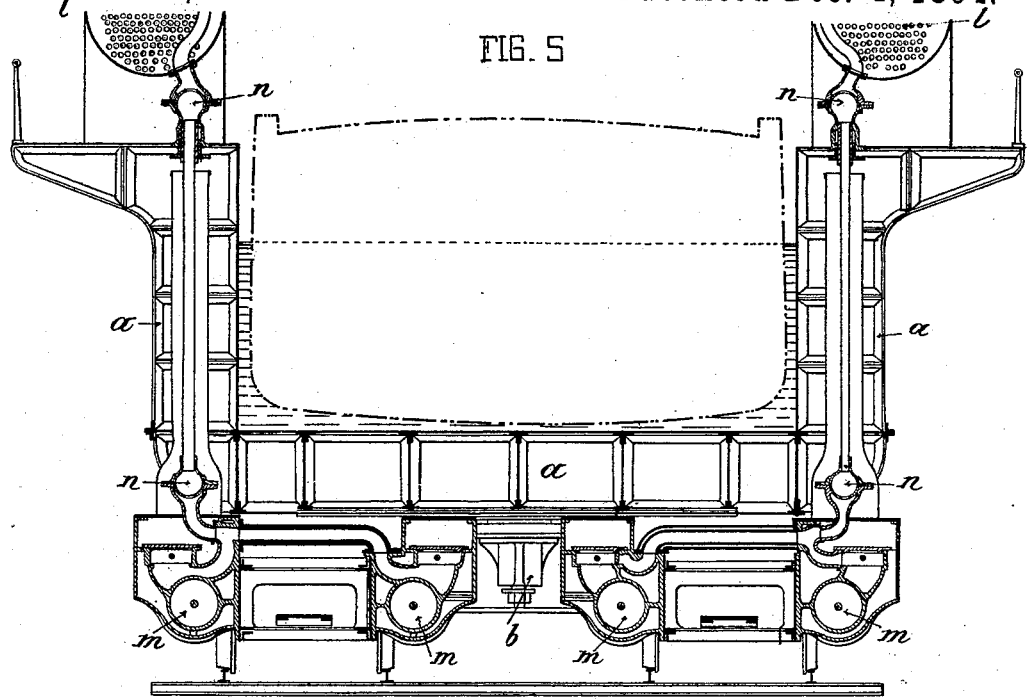
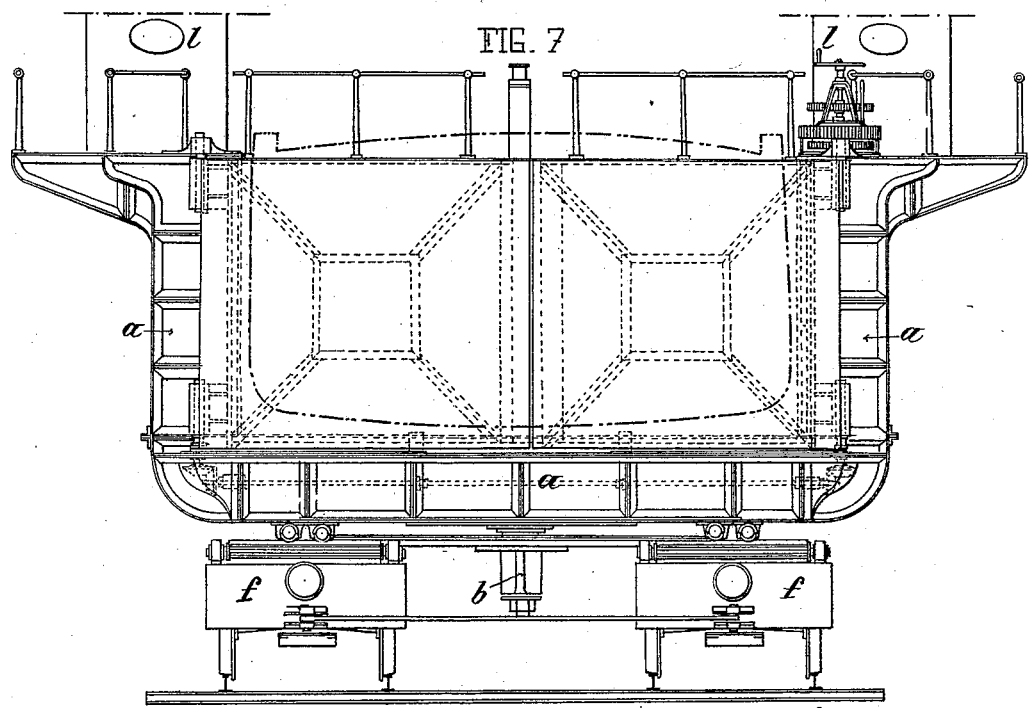

(No Model.) 8 Sheets—Sheet 7.

A. M. G. SÉBILLOT & F. WEIDKNECHT.
SHIP RAILWAY.

No. 530,245. Patented Dec. 4, 1894.

(No Model.) 8 Sheets—Sheet 8.
A. M. G. SÉBILLOT & F. WEIDKNECHT.
SHIP RAILWAY.
No. 530,245. Patented Dec. 4, 1894.
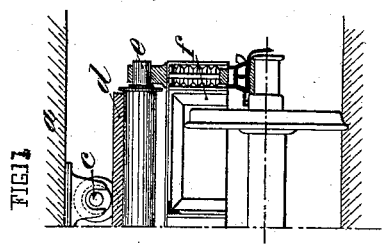
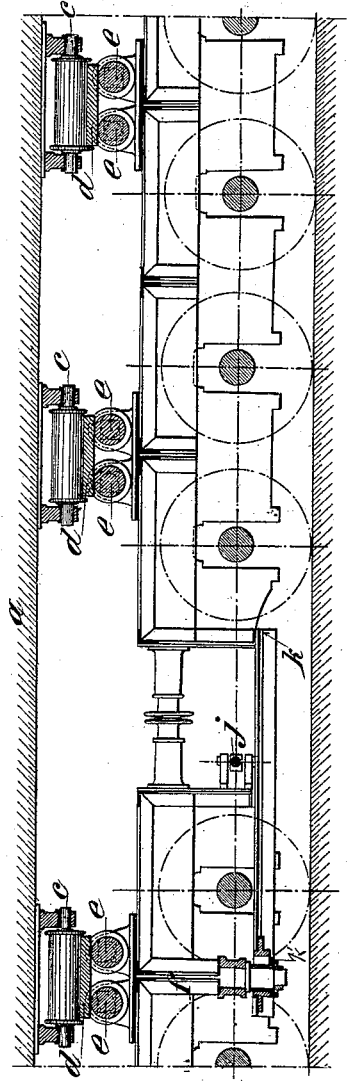
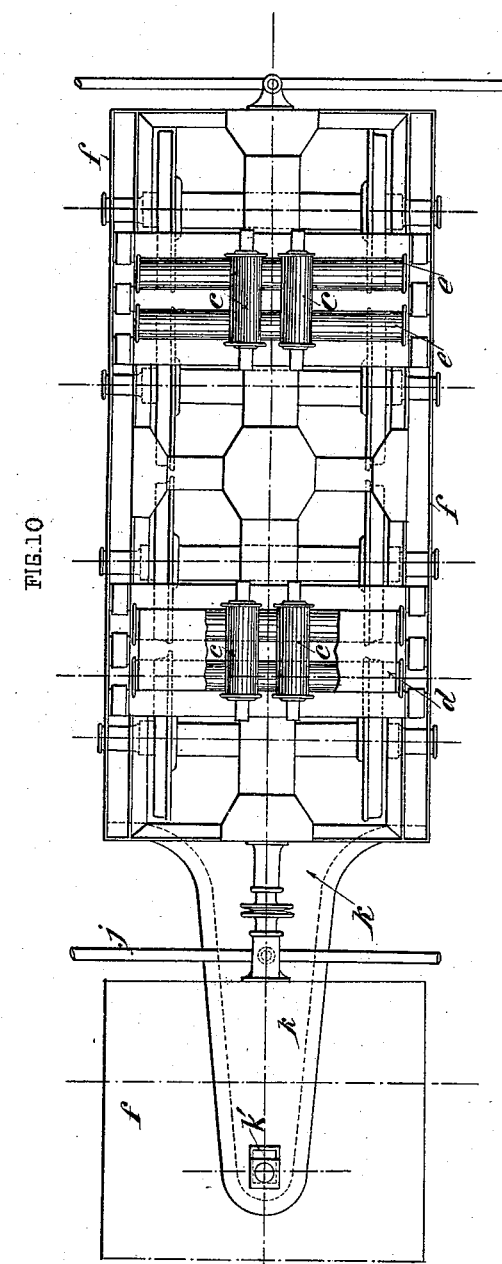

UNITED STATES PATENT OFFICE.

AMÉDÉE MATHURIN GABRIEL SÉBILLOT AND FREDERIC WEIDKNECHT, OF PARIS, FRANCE.

SHIP-RAILWAY.

SPECIFICATION forming part of Letters Patent No. 530,245, dated December 4, 1894.

Application filed August 4, 1892. Serial No. 442,121. (No model.)

*To all whom it may concern:*

Be it known that we, AMÉDÉE MATHURIN GABRIEL SÉBILLOT and FREDERIC WEIDKNECHT, both of Paris, France, have invented Improvements in Ship-Railways, of which the following is a full, clear, and exact description.

This invention relates to improved means for transporting navigable vessels on railways and even over curves of small radius which the systems of ship transport heretofore proposed have not been able to accomplish.

The object of this invention is to combine a uniform distribution of the load with the flexibility of wheel base necessary for passing curves of short radius and to provide a means of transport adapted to act as well in water as on land, which has means thereon for propelling the same and which utilizes its weight for adhesion, can descend a slope into the water without external aid to receive or discharge a vessel, can pass freely over ordinary railway curves, possesses the requisite stability and insures the distribution of the weight uniformly over the whole of the axles.

The apparatus is applicable for the transport of vessels of all dimensions, either dry or inclosed in a lock containing water.

Reference is to be had to the accompanying drawings, forming part of this specification, wherein like characters designate like parts, and in which—

Figure 2A:
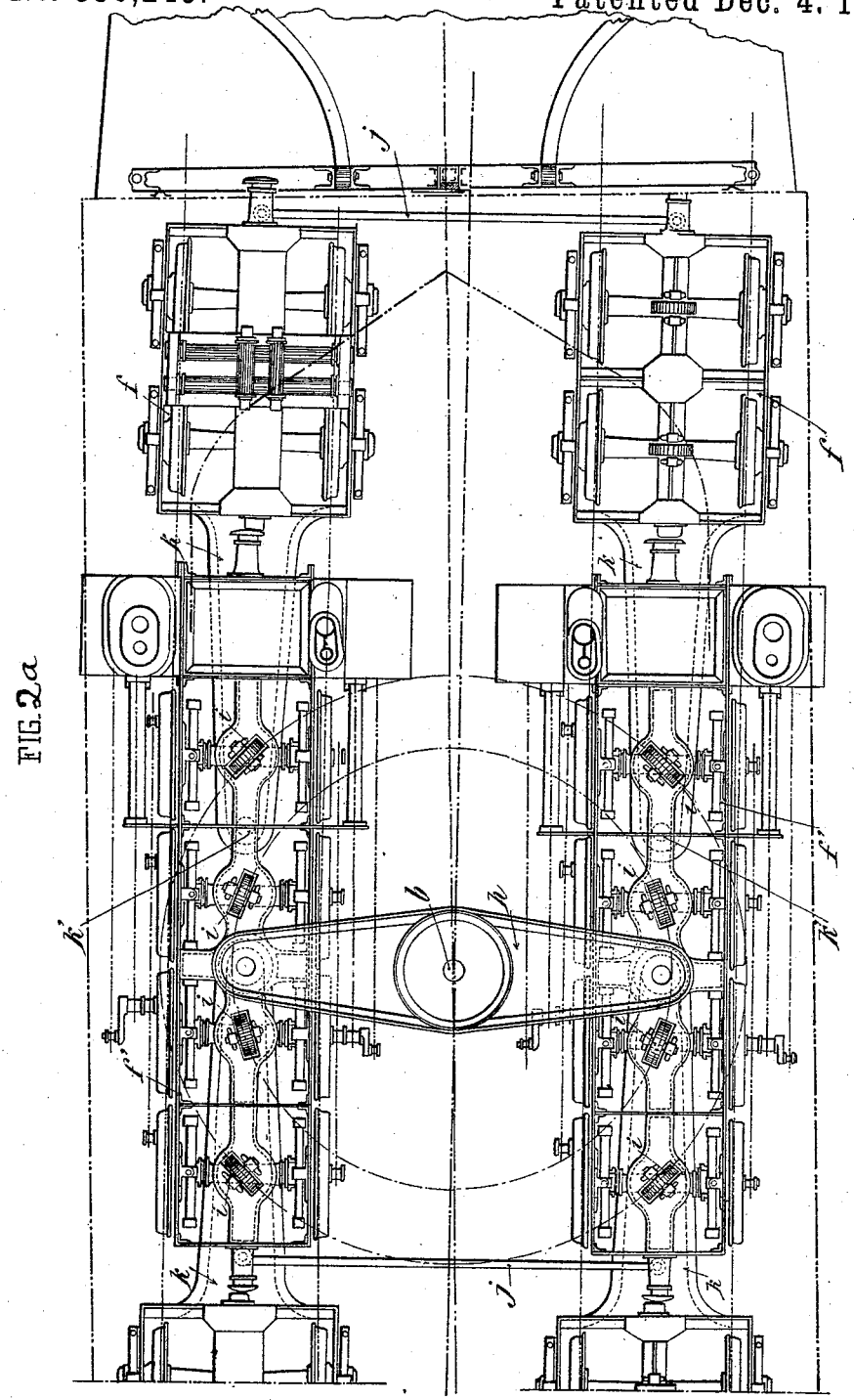
Figure 6:
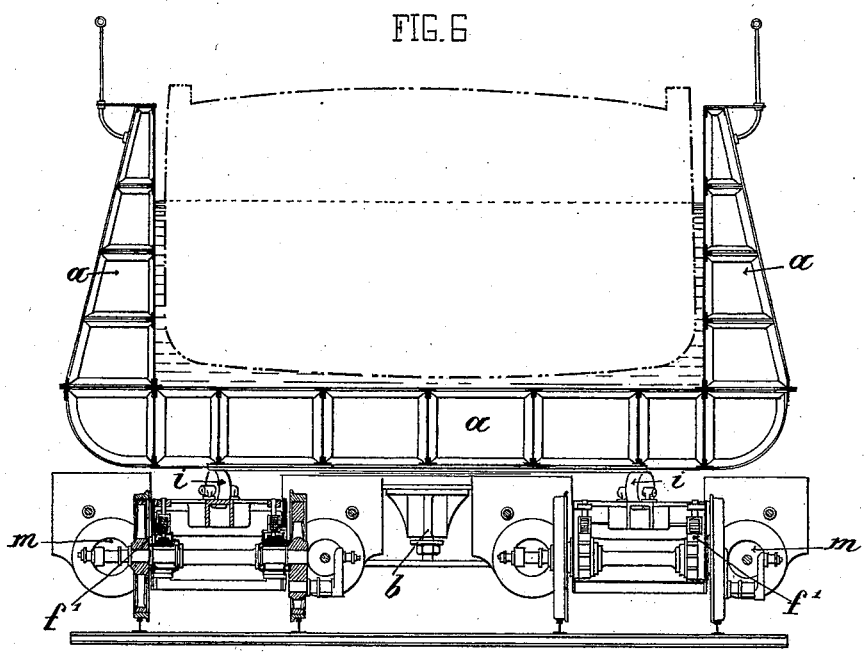
Figure 8:
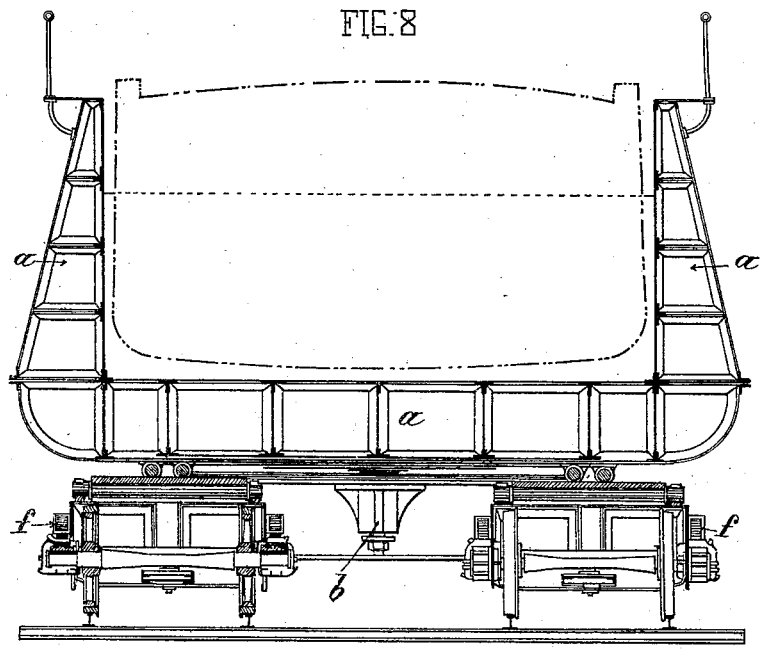

Figure 1 is a side elevation with parts thereof shown in section of part of a ship railway showing our invention applied thereto. Fig. 2 is a similar view of the remainder of the ship railway, likewise showing our invention applied thereto, Fig. 2 being a continuation of Fig. 1 and representing the rear portion of the train. Fig. 2ª is a diagrammatic plan view of the operating parts of Fig. 1 showing some of the parts in detail. Fig. 3 is a similar plan view of Fig. 2. Fig. 4 is an end view partly in section of our improved ship railway. Fig. 5 is a vertical transverse section through our improved ship railway showing the cylinders and boilers in section. Fig. 6 is a transverse section of our ship railway taken through the wheels of the engine bogies. Fig. 7 is a rear end view of the ship carrier. Fig. 8 is an end view of the ship carrier showing the swiveling trucks in section. Figs. 9, 10 and 11 respectively represent a longitudinal section, plan and transverse section of a portion of a truck clearly showing several sets of bed-rollers, as will be more fully hereinafter set forth. Figs. 12, 13 and 14 respectively represent a face view, end view and plan of the automatic lubricator which we may employ, and which will be more fully set forth hereinafter. Fig. 15 represents a diagrammatic view of one form of means employed by us for shoring and rigidly holding a vessel in the dock or carrier.

The carrier or dock $a$ for receiving the vessel consists of a kind of cradle provided or not with gates at the ends, according to whether or not the vessel is to be transported in water. The carrier is constructed by preference of an iron framework whose interior shape conforms approximately to that of the vessels it is to contain.

In order to avoid excessive friction in the transverse and longitudinal movements of the swiveling trucks in turning curves and traveling in the forward or backward direction, the system of bed rollers in two sets superposed at right angles to each other is used as hereinafter described.

The carrier $a$, Fig. 1, is connected to the wheeled under frames by two main pivots $b$ disposed in its longitudinal axis at suitable distances from the ends and is supported throughout its length upon said under frames by means of pairs of longitudinal rollers $c\ c$ (Figs. 9, 10 and 11) mounted at the under side of the carrier $a$ and resting upon pairs of transverse rollers $e\ e$ mounted on the swiveling trucks $f$ a steel plate $d$ being interposed between the upper and lower sets of rollers $c\ e$ to form a rolling surface which being free and only retained in place by the flanges of the rollers partakes in all their movements.

The wheeled base comprises two series or trains of trucks $f$ running side by side on two or more parallel sets of rails. The two trains or series of trucks are alike in arrangement and each comprises bogie or swiveling trucks and a number of swiveling carrier trucks.

The form of ship carrier illustrated in the drawings is one example of the apparatus for traveling upon an ordinary double line of railway and comprising say sixteen trucks $f$. The engine bogie trucks $f'$ are placed side by side and swivel about the spherical bosses $g$ (Fig. 4) at the ends of the transverse connecting and equalizing beam $h$ and received in corresponding seats in the bogie truck frames the two beams working on the pivots $b$ beneath the center of the dock $a$ as before stated. Each of the engine bogies $f'$ is thus free to follow all irregularities in the line. Each bogie $f'$ is provided with rollers $i$ whose axes are radial to the pivotal axis of the beam $h$. The parallelism between the various pairs of trucks $f$ and $f'$ is assured by transverse connecting rods $j$ pivoted to the ends of and connecting each pair of said trucks. Each of the engine bogies $f'$ is connected as shown to a series of trucks $f$ for uniformly distributing the load.

The leading and trailing trucks $f$ (Figs. 1 and 2) are shown as coupled to each bogie truck by an arm $k$ swiveling on a center $k'$ pivoted on the engine bogie truck $f'$ at a suitable point near the bogie pin, the arms $k$ both of the leading and trailing trucks being pivoted to the same bogie truck. The pivots $k'$ of the swivel arms $k$ are received in slotted bearings to permit of the longitudinal displacement necessary to allow of the play of the buffer springs. Each swiveling truck $f$ has one or more sets of crossed bed rollers between it and the dock to permit of the longitudinal and transverse motion of the trucks with regard to the carrier.

The engines which may be any kind are represented as similar to an ordinary locomotive (see Fig. 5) applied to each of the leading bogie trucks $f'$. The locomotive boilers $l$ are mounted on the dock at such a height as to be above the water level when the dock is submerged. Each engine has a pair of cylinders $m$ mounted on the bogie truck $f'$ and the steam and exhaust pipes have ball and socket joints $n$ to permit of the swiveling movements of the trucks and stuffing-box joints to permit variation of length. The cylinders $m$ and the steam and exhaust pipes are jacketed to prevent excessive condensation when the apparatus is immersed.

The engines and cylinders may be varied in number and be mounted on the ship carrier or dock instead of on the bogie motion being transmitted to the wheels by intermediate gear. The lubrication of the axles is effected automatically from a distance so as to insure efficient lubrication even when under water, the preferred arrangement being that represented in Figs. 13 and 14. $u$ is the axle box sliding in the horn plates $g$ and surmounted by a crosshead $o$ upon which bears a series of springs $p\ p\ p$. In the upper part of the axle-box is a channel $r$ to which the oil is supplied through a pipe $s$ in communication with a common reservoir or small pump, the pipe being made flexible so as to allow of free play of the box in its guides. The supply of oil is regulated in any suitable manner and conveyed to the grooves by which it is distributed upon the revolving surface.

The lubrication may be regulated while in action by varying the pressure. The considerable dimensions of the revolving parts which moreover form part of a single vehicle render this system of lubrication both easy of application and effectual for maintaining the frictional surfaces in working order. The entire vehicle may be brought to a standstill at once for which purpose the whole of the wheels would be furnished with brake shoes which may be applied from a distant point on the dock either by means of a vacuum, steam or mechanically.

The shoring of the vessel in the dock may be effected in various ways, the arrangement illustrated in Fig. 15 being that which is preferred. It consists essentially in supporting both sides of the hull by means of mooring cables or straps $v$ attached to the bottom of the dock and put in tension by hydraulic pistons $x$ in combination with lateral screw-jacks $y$. The wheel train is similar in arrangement to that already described with reference to Figs. 1 to 8 but the trucks are preferably placed four abreast upon as many pair of rails. The propelling bogies are each composed of four trucks upon which are pivoted cross beams as in the former arrangement the trucks being also connected together by means of connecting rods so as to render their derailment impossible. Each element of the train taken separately acts in the same manner as before explained.

We claim—

1. In a dock for transporting ships and other vessels on railways, the combination with the dock or carrier of swiveling trucks and bogies connected transversely in parallel pairs by pivoted cross-beams and connecting rods so as to be free to swivel beneath the dock and adapted for passing curves of relatively small radius as described.

2. In a dock for transporting ships and other vessels on railways the combination with the dock or carrier and with the swiveling trucks of intermediate sets of rollers placed at right angles to, and superposed the one set on the other with a plate interposed between them whereby to permit free longitudinal and transverse movements of the trucks as described and illustrated in the drawings.

The foregoing specification of our improvements in ship-railways signed by us this 29th day of June, 1892.

AMÉDÉE MATHURIN GABRIEL SÉBILLOT.
FREDERIC WEIDKNECHT.

Witnesses:
ROBT. M. HOOPER,
PIERRE ERNEST EISSIER.